US012384303B1

(12) United States Patent
Huang

(10) Patent No.: US 12,384,303 B1
(45) Date of Patent: Aug. 12, 2025

(54) NAVIGATION DEVICE

(71) Applicant: Guanghua Huang, Shenzhen (CN)

(72) Inventor: Guanghua Huang, Shenzhen (CN)

( * ) Notice: Subject to any disclaimer, the term of this patent is extended or adjusted under 35 U.S.C. 154(b) by 0 days.

(21) Appl. No.: 18/826,812

(22) Filed: Sep. 6, 2024

(30) Foreign Application Priority Data

Aug. 29, 2024 (CN) .......................... 202422107065.8

(51) Int. Cl.
*B60R 11/02* (2006.01)
*B60R 11/00* (2006.01)

(52) U.S. Cl.
CPC ... *B60R 11/0258* (2013.01); *B60R 2011/0066* (2013.01); *B60R 2011/008* (2013.01)

(58) Field of Classification Search
CPC ..... B60R 2011/0059; B60R 2011/0071; B60R 2011/0078; B60R 11/0258; B60R 11/0205; B60R 11/02; B60R 2011/0066; B60R 2011/008; B60R 2011/0084
USPC .......................... 296/37.1; 224/929; 701/444
See application file for complete search history.

(56) References Cited

U.S. PATENT DOCUMENTS

| | | | | |
|---|---|---|---|---|
| 4,066,307 A * | 1/1978 | Barding | ................ | B60R 11/02 70/423 |
| 4,738,420 A * | 4/1988 | Angle | ................ | B60R 11/0205 455/345 |
| 4,829,595 A * | 5/1989 | Kobayashi | ............. | H04B 1/082 312/7.1 |
| 4,867,398 A * | 9/1989 | Butcher | .............. | B60R 11/0205 248/27.3 |
| 4,895,326 A * | 1/1990 | Nimpoeno | ............. | B60K 35/50 455/345 |
| 4,911,386 A * | 3/1990 | Putman | .................. | B60K 35/50 455/345 |
| 5,779,197 A * | 7/1998 | Kim | .................... | B60R 11/0211 296/70 |
| 5,791,606 A * | 8/1998 | Blackburn | .......... | B60R 11/0205 361/814 |
| 5,887,829 A * | 3/1999 | Wong | ..................... | B60R 11/02 248/27.1 |
| 6,504,731 B2 * | 1/2003 | Okamoto | ............. | H05K 5/0017 174/72 A |

(Continued)

FOREIGN PATENT DOCUMENTS

| | | | | |
|---|---|---|---|---|
| DE | 202004010667 U1 * | 12/2004 | .......... | G11B 25/043 |
| KR | 19980033415 U * | 9/1998 | | |
| WO | WO-2013008388 A1 * | 1/2013 | ............. | B60R 11/02 |

*Primary Examiner* — Hilary L Gutman

(57) ABSTRACT

A navigation device includes a navigation device main body and a mounting bracket. The mounting bracket is detachably connected to the navigation device main body. The mounting bracket is used for connecting with a car. Therefore, the navigation device main body is capable of being disassembled and separated from the mounting bracket. This not only facilitates production and marketing, but also makes it easy for a user to install the navigation device main body and the mounting bracket. Moreover, the navigation device has strong universality, and the navigation device main body or the mounting bracket can be replaced according to the needs of different users. The difficulty of modification is relatively small, especially for people who need to modify their car navigation devices. Non professionals can also complete the modification work easily, greatly improving the user's modification experience, and effectively reducing a return rate.

18 Claims, 15 Drawing Sheets

(56) References Cited

U.S. PATENT DOCUMENTS

| | | | | |
|---|---|---|---|---|
| 7,165,798 B2* | 1/2007 | Chamberlain | ...... | B60R 11/0205 |
| | | | | 296/37.1 |
| 8,264,856 B2* | 9/2012 | Snider | ................. | H05K 1/0215 |
| | | | | 381/86 |
| 8,416,566 B2* | 4/2013 | Renkel, Jr. | ............ | H05K 7/1491 |
| | | | | 361/752 |
| D704,697 S * | 5/2014 | Fiore, IV | ..................... | D14/258 |
| 2001/0016432 A1* | 8/2001 | Yamauchi | .............. | B60K 35/10 |
| | | | | 439/34 |
| 2003/0160134 A1* | 8/2003 | Upson | ................... | B60K 35/50 |
| | | | | 296/70 |
| 2006/0250531 A1* | 11/2006 | Hsu | .................... | B60R 11/0235 |
| | | | | 348/844 |
| 2008/0043408 A1* | 2/2008 | Quilling | ................. | B60R 11/02 |
| | | | | 361/679.01 |
| 2008/0049949 A1* | 2/2008 | Snider | ................... | H05K 13/00 |
| | | | | 381/86 |
| 2009/0268411 A1* | 10/2009 | Baker | .................... | B60R 11/02 |
| | | | | 29/428 |
| 2010/0053882 A1* | 3/2010 | Hayashi | .............. | H04B 1/3822 |
| | | | | 361/679.43 |
| 2011/0292769 A1* | 12/2011 | Snider | ................. | H05K 9/0045 |
| | | | | 368/47 |
| 2012/0160974 A1* | 6/2012 | Washiyama | ............ | B60R 11/02 |
| | | | | 248/201 |
| 2014/0347831 A1* | 11/2014 | Snider | ................... | G04G 5/002 |
| | | | | 361/752 |
| 2018/0041236 A1* | 2/2018 | Riggs | ................. | B60R 11/0205 |
| 2021/0138901 A1* | 5/2021 | Shoji | ...................... | B60K 35/00 |

* cited by examiner

NAVIGATION DEVICE

TECHNICAL FIELD

The present disclosure relates to the field of automobiles, particularly to a navigation device.

BACKGROUND ART

In recent years, China's automobile industry has developed rapidly, with an extremely fast growth rate that is far ahead of the world. With the construction of roads, economic exchanges between cities have become more frequent, and car navigation devices have become very important. A navigation device that integrates accurate positioning, navigation, and entertainment functions can better meet the needs of car owners and become a basic equipment on the car.

The current car audio-visual navigation devices on the current market adopt an integral-machine structure, with a host (including a housing), a mounting plate, and a display screen installed and sold as an integral whole. This has many drawbacks, for example: nowadays, car navigation devices are all integral machines, with extremely low modularization and universalization. With the increasing number of car models, it has caused difficulties in the entire business process of production, wholesale, and retail. Not only is it inconvenient for production, manufacturing, and marketing, but it is also extremely difficult to modify for people who need to modify car navigation devices, making it difficult for non professionals to complete the modification work and resulting in a very high return rate.

SUMMARY

In order to overcome the shortcomings of the prior art, a navigation device is provided in the present disclosure. The navigation device includes a navigation device main body and a mounting bracket. The mounting bracket is detachably connected to the navigation device main body. The mounting bracket is used for connecting with a car.

As an improvement of the present disclosure, the navigation device main body includes a screen. The screen is detachably connected to the mounting bracket. The navigation device further includes first connecting parts. The screen is detachably connected to the mounting bracket through the first connecting part.

As an improvement of the present disclosure, the navigation device main body further includes a host. The host is electrically connected to the screen. The host is electrically connected to the screen through an electrical connection cable.

As an improvement of the present disclosure, the navigation device main body further includes a host. The host is electrically connected to the screen. The host is detachably connected to the mounting bracket.

As an improvement of the present disclosure, the first connecting part includes a first connecting member and a first connecting fitting member. The first connecting member is connected to the screen, the first connecting fitting member is connected to the mounting bracket, and the first connecting member is detachably connected to the first connecting fitting member.

As an improvement of the present disclosure, the first connecting member is a first connecting buckle, and the first connecting fitting member is provided with a first connecting opening. The first connecting buckle is provided with an elastic wall. When the first connecting buckle is inserted into the first connecting opening, the elastic wall is pressed against and locked to an inner wall of the first connecting opening. Alternatively, the first connecting fitting member is a first connecting buckle, the first connecting member is provided with a first connecting opening, and the first connecting buckle is provided with an elastic wall. When the first connecting buckle is inserted into the first connecting opening, the elastic wall is pressed against and locked to an inner wall of the first connecting opening.

As an improvement of the present disclosure, the elastic wall is provided with concave fixing slot portions and guiding inclined surfaces adjacent to the fixing slot portions. The guiding inclined surface is connected to the fixing slot portion, and the inner wall of the first connecting opening is equipped with protruding buckle portions. The guiding inclined surface and the fixing slot portion pass through the first connecting opening in sequence, so that the fixing slot portion is engaged with the buckle portion.

As an improvement of the present disclosure, the first connecting member is detachably connected to the screen, and the first connecting fitting member is detachably connected to the mounting bracket.

As an improvement of the present disclosure, the first connecting member is a first connecting buckle, and the first connecting fitting member is equipped with a first connecting opening. The first connecting buckle is equipped with an elastic wall. When the first connecting buckle is inserted into the first connecting opening, the elastic wall is pressed against and locked to an inner wall of the first connecting opening. Alternatively, the first connecting fitting member is a first connecting buckle, the first connecting member is equipped with a first connecting opening, and the first connecting buckle is equipped with an elastic wall. When the first connecting buckle is inserted into the first connecting opening, the elastic wall is pressed against and locked to an inner wall of the first connecting opening.

As an improvement of the present disclosure, the first connecting member is also equipped with first guiding protrusions, and the inner wall of the first connecting opening is also provided with first guiding grooves. The first guiding protrusion is connected to the first guiding groove. The first connecting member is also provided with a first connecting lug. The first connecting lug is provided with a second mounting hole.

The second mounting hole is used for detachable connection between the first connecting member and the screen. The first connecting fitting member is also provided with a second connecting lug. The second connecting lug is provided with a third mounting hole. The third mounting hole is used for detachable connection between the first connecting fitting member and a mounting bracket. The first connecting member includes a main body part and an elastic part. The elastic part is detachably connected to the main body part, and the elastic wall is provided on the elastic part. An elastic gap is defined between the elastic wall and the main body part. The main body part is provided with a mounting block, and the elastic part is provided with a mounting slot. An upper side of the mounting slot is provided with a first elastic block, and a lower side of the mounting slot is provided with a second elastic block. A flexible slit is formed between the first elastic block and the second elastic block, and the mounting block is inserted into the mounting slot through the slit. The first elastic block and the second elastic block stop the mounting block in the mounting slot.

Beneficial effects of the present disclosure are as follows. The navigation device is provided in the present disclosure. The navigation device includes the navigation device main body and the mounting bracket. The mounting bracket is detachably connected to the navigation device main body. The mounting bracket is used for connecting with the car. Therefore, the navigation device main body is capable of being disassembled and separated from the mounting bracket. This not only facilitates production, manufacturing, and marketing, but also makes it easy for a user to install the navigation device main body and the mounting bracket. Moreover, the navigation device has strong universality, and the navigation device main body or the mounting bracket can be replaced according to the needs of different users. The difficulty of modification is relatively small, especially for people who need to modify their car navigation devices. Non professionals can also complete the modification work easily, thereby greatly improving the user's modification experience, and effectively reducing the return rate.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
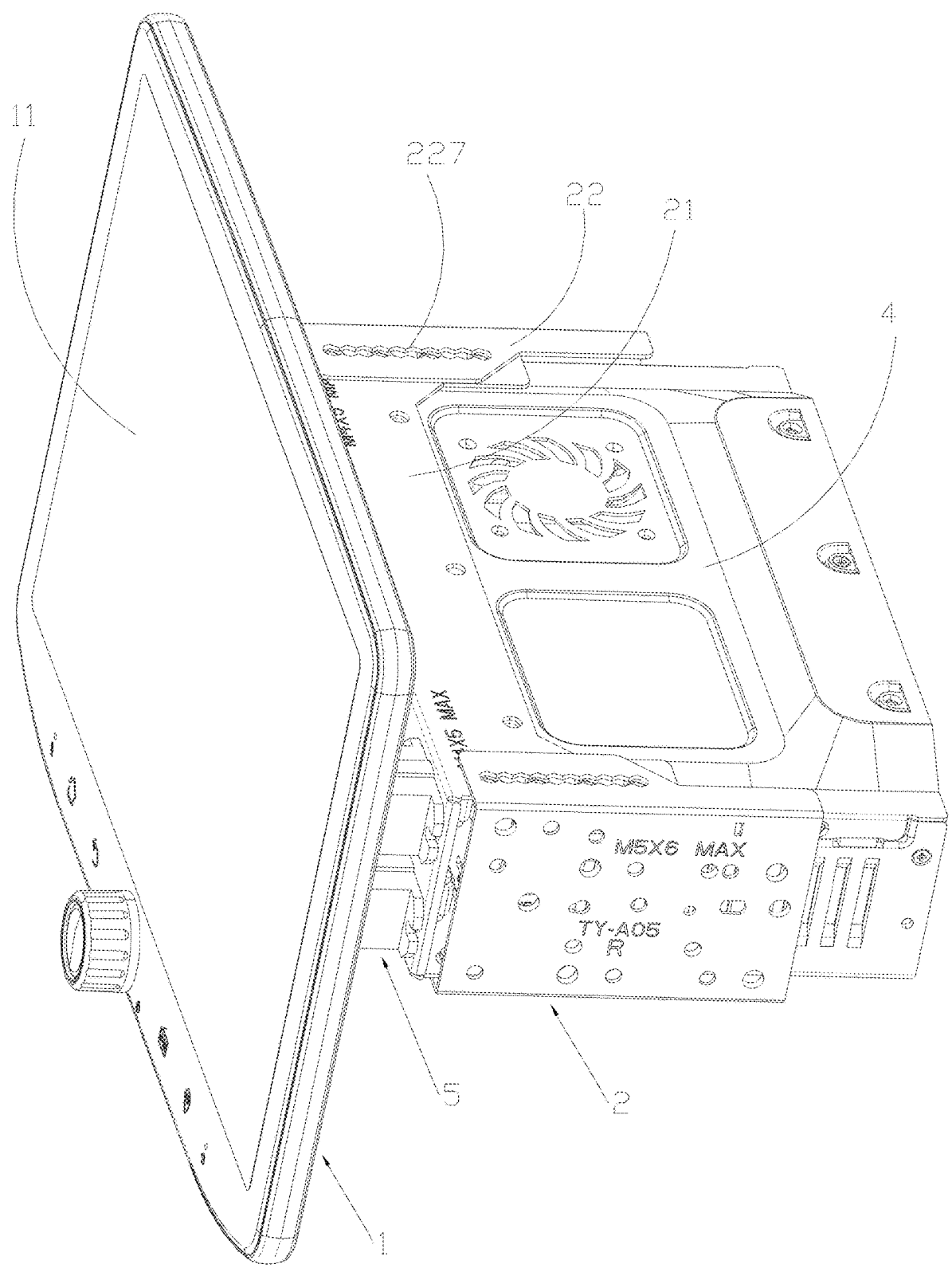
FIG. 1 is a schematic diagram of an overall structure of the present disclosure.
Figure 2:
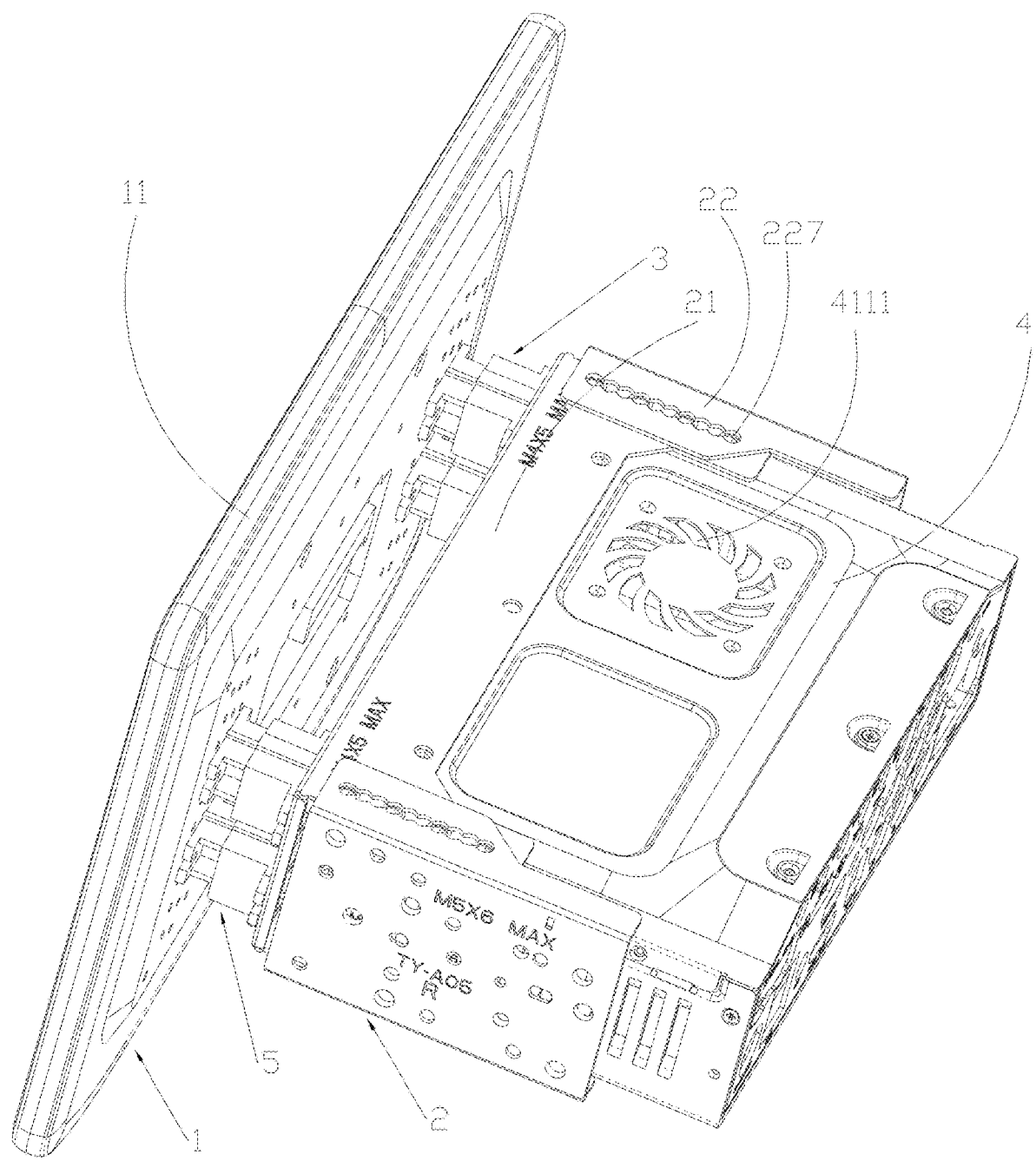
FIG. 2 is another schematic diagram of an overall structure of the present disclosure.
Figure 3:
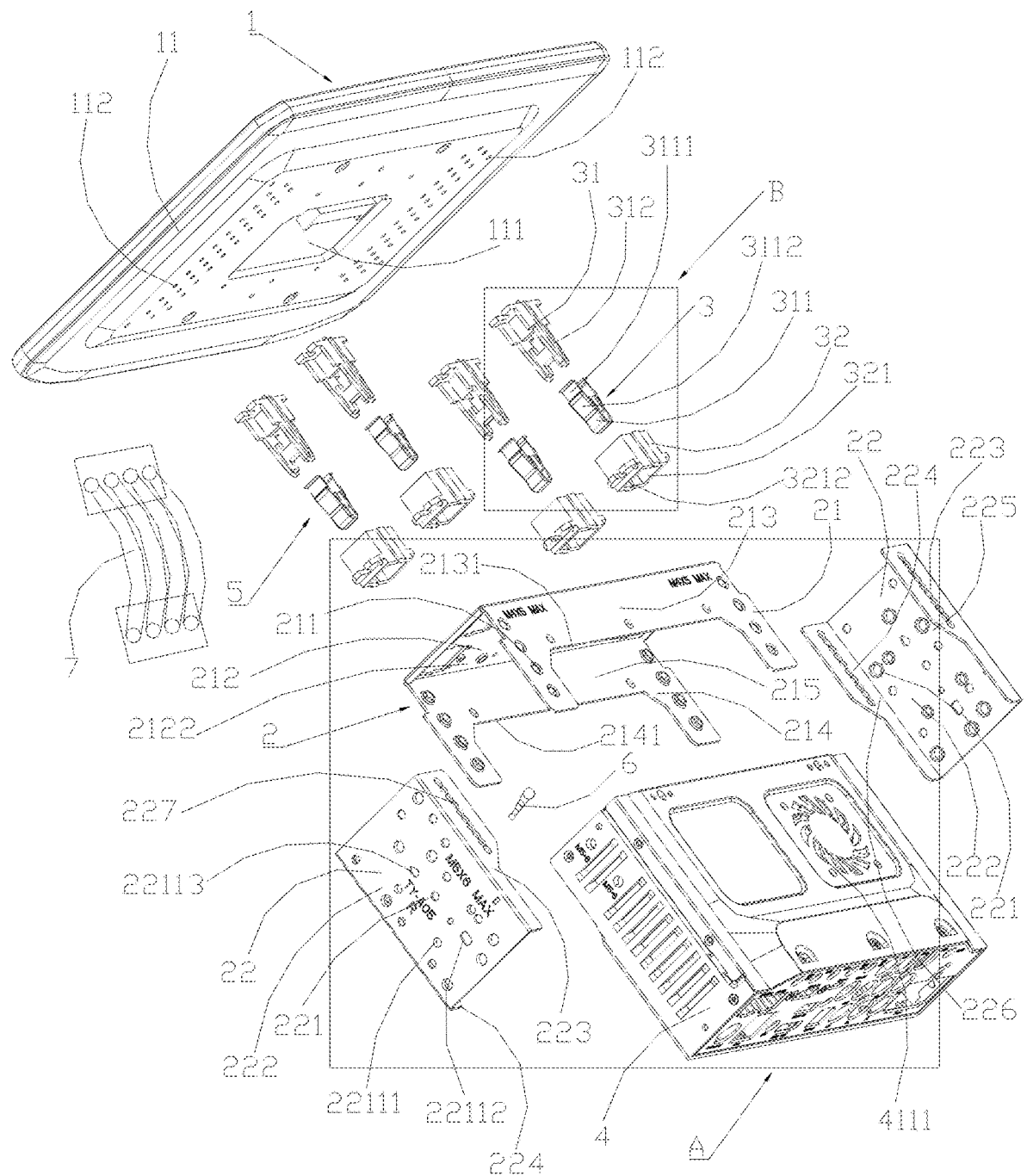
FIG. 3 is an exploded view of the present disclosure.
Figure 4:
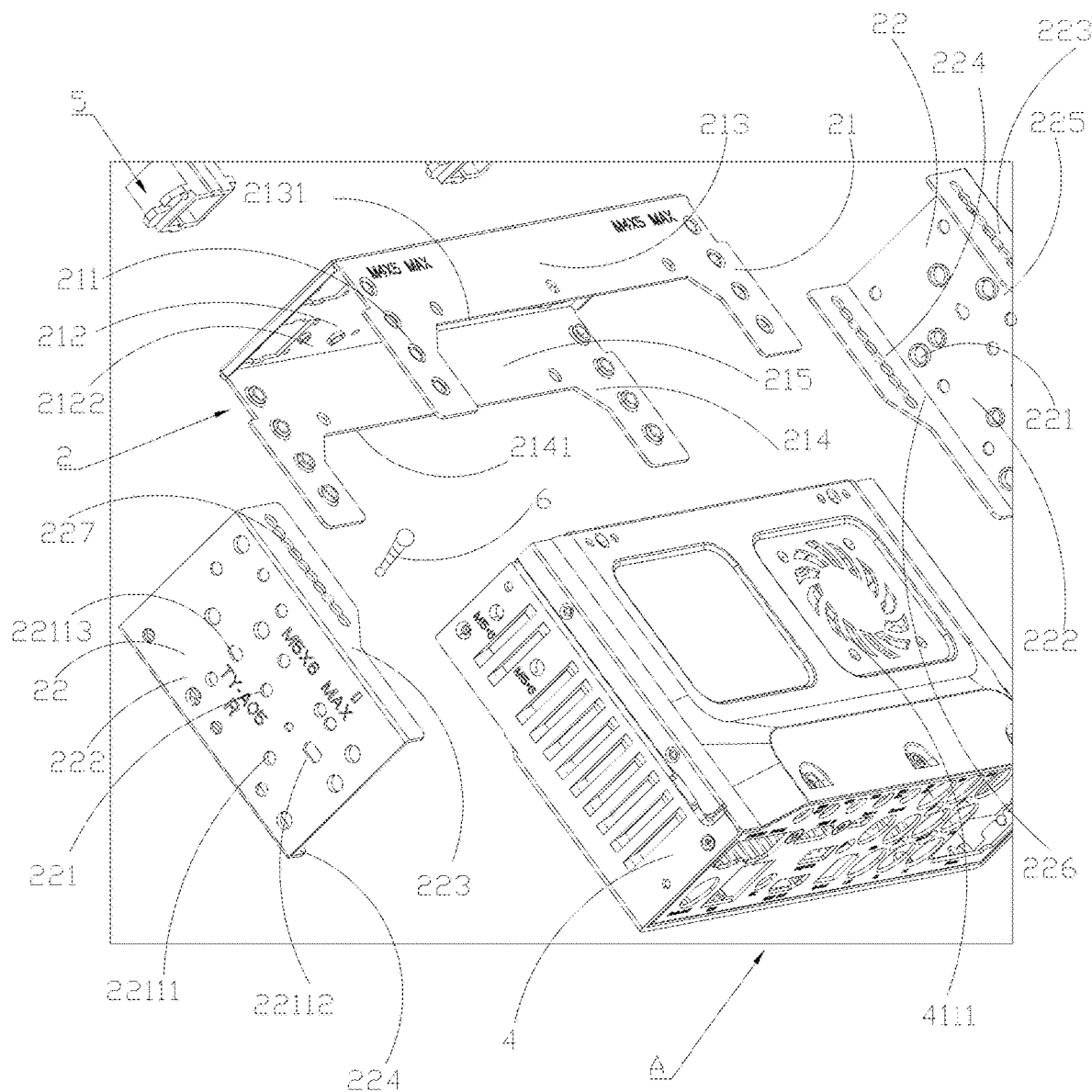
FIG. 4 is an enlarged view of area A in FIG. 3.
Figure 5:
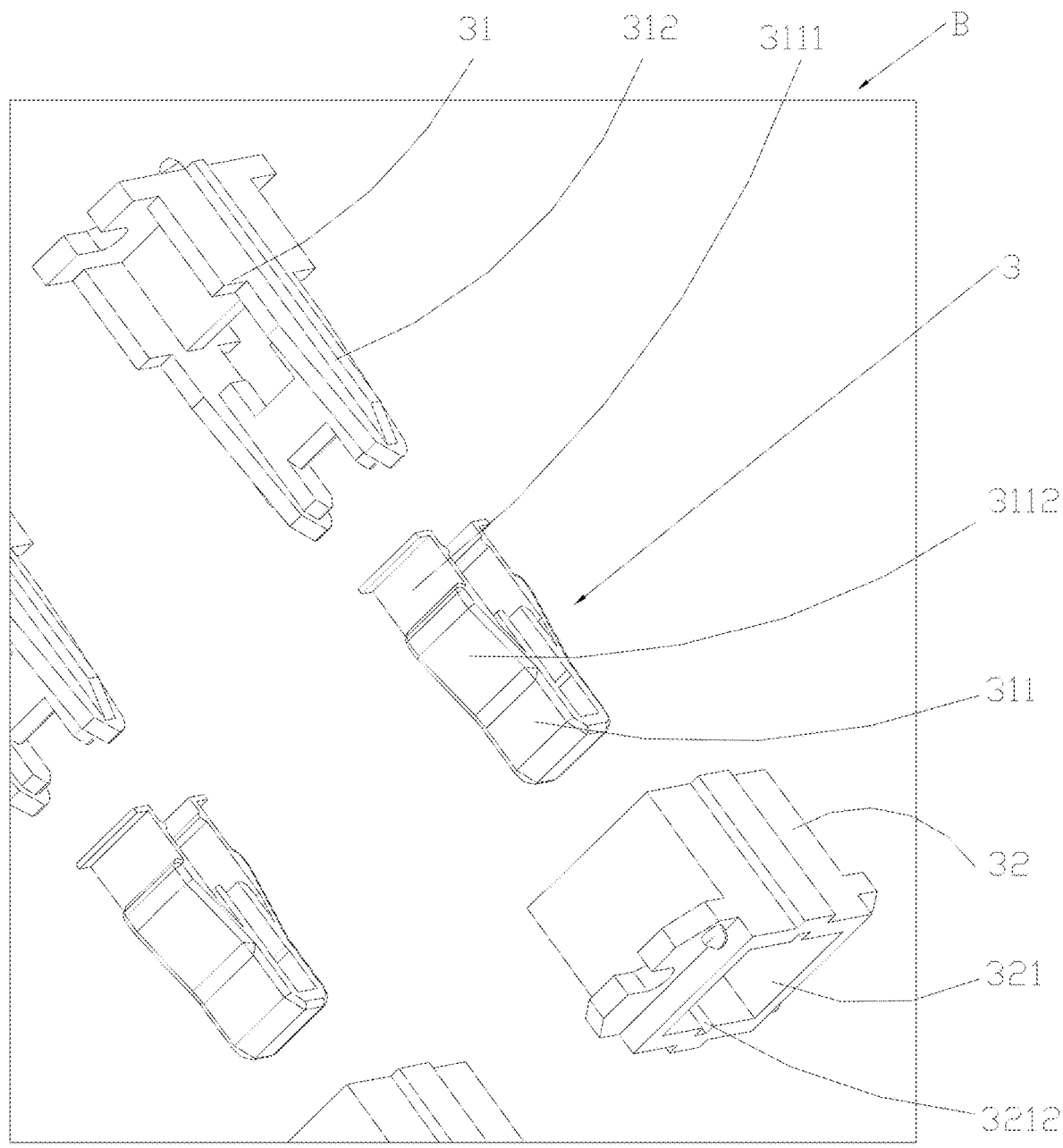
FIG. 5 is an enlarged view of area B in FIG. 3.
Figure 6:
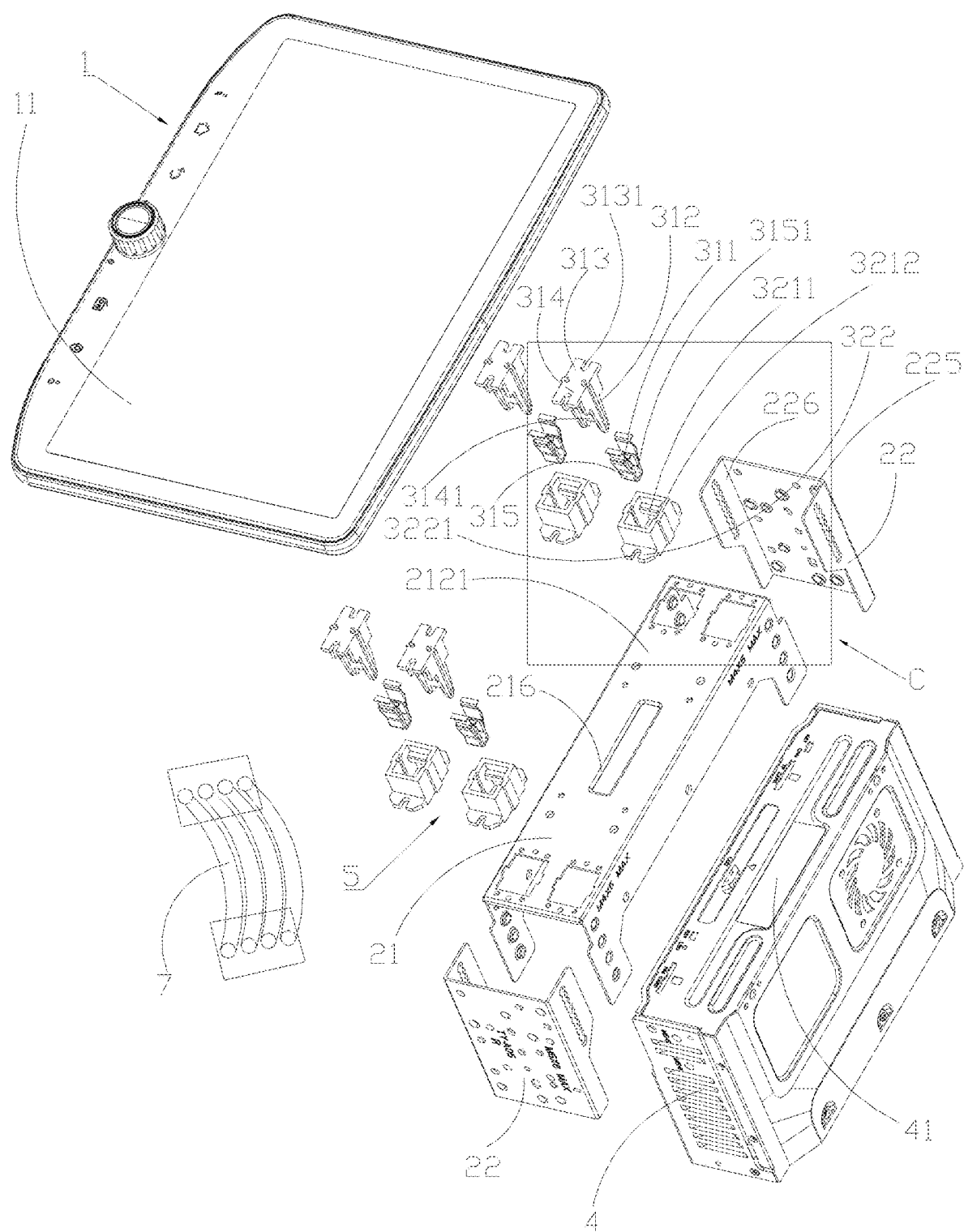
FIG. 6 is another exploded view of the present disclosure.
Figure 7:
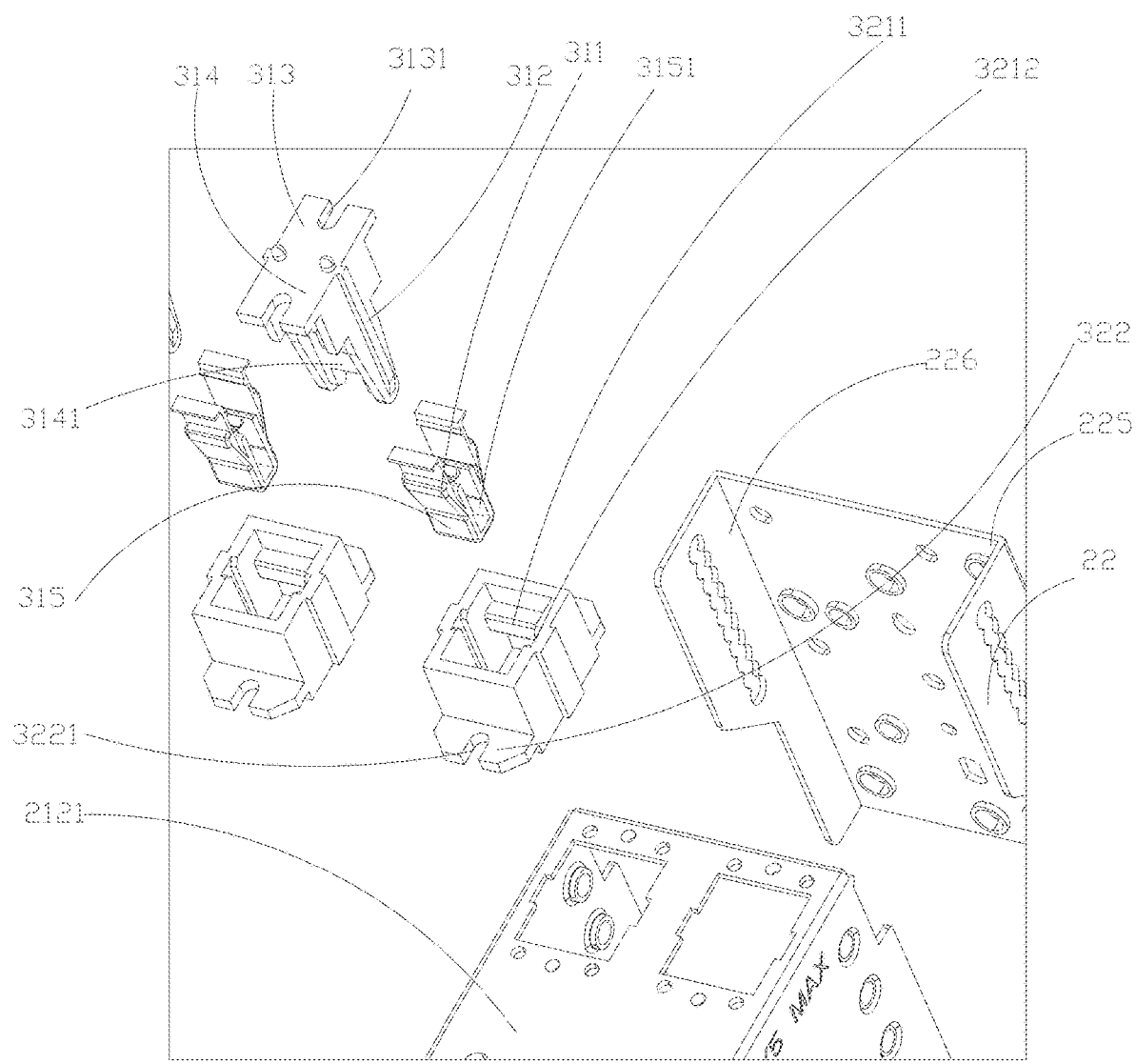
FIG. 7 is an enlarged view of area C in FIG. 6.
Figure 8:
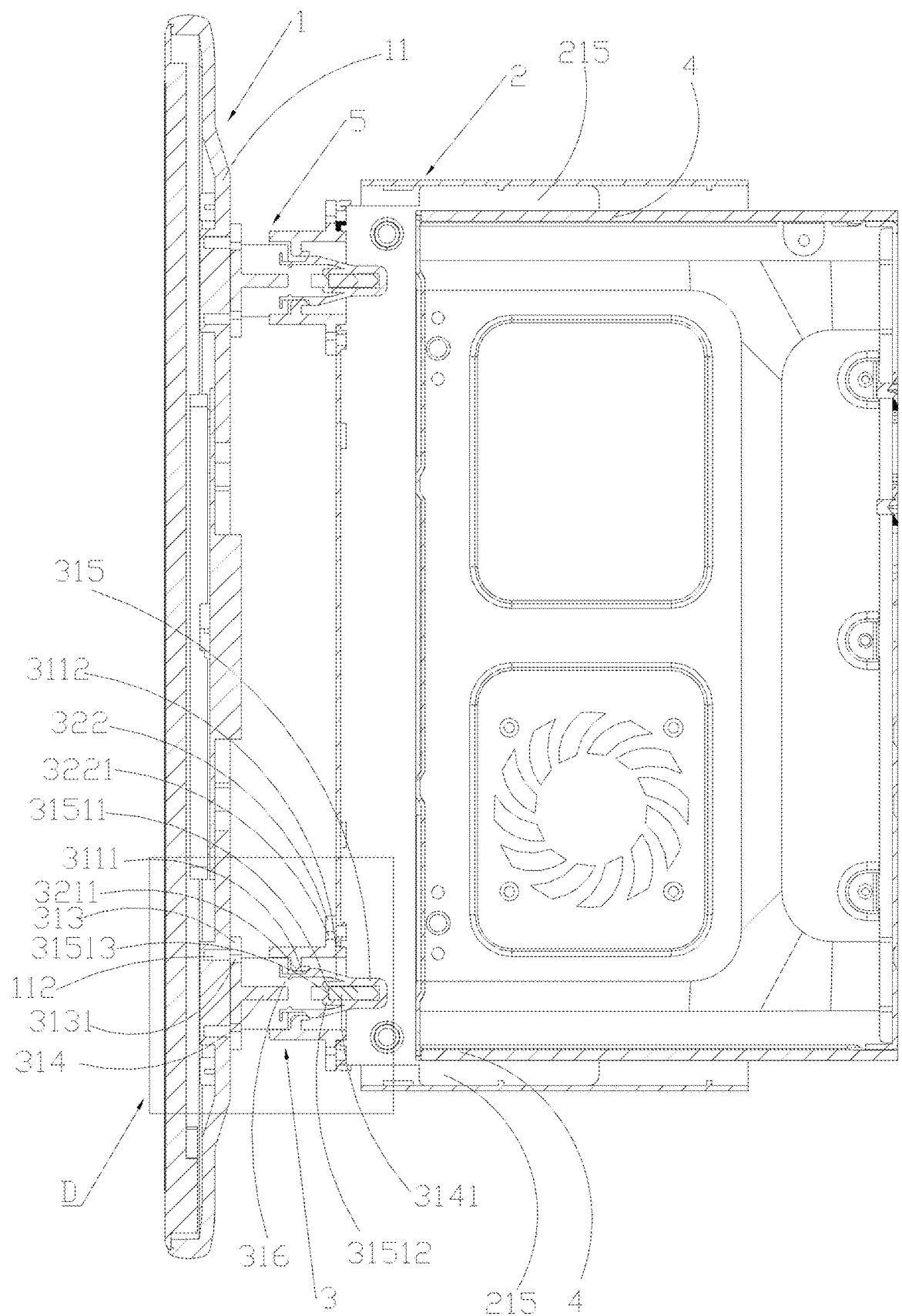
FIG. 8 is a sectional view cut along a screen, a host, and a mounting bracket.
Figure 9:
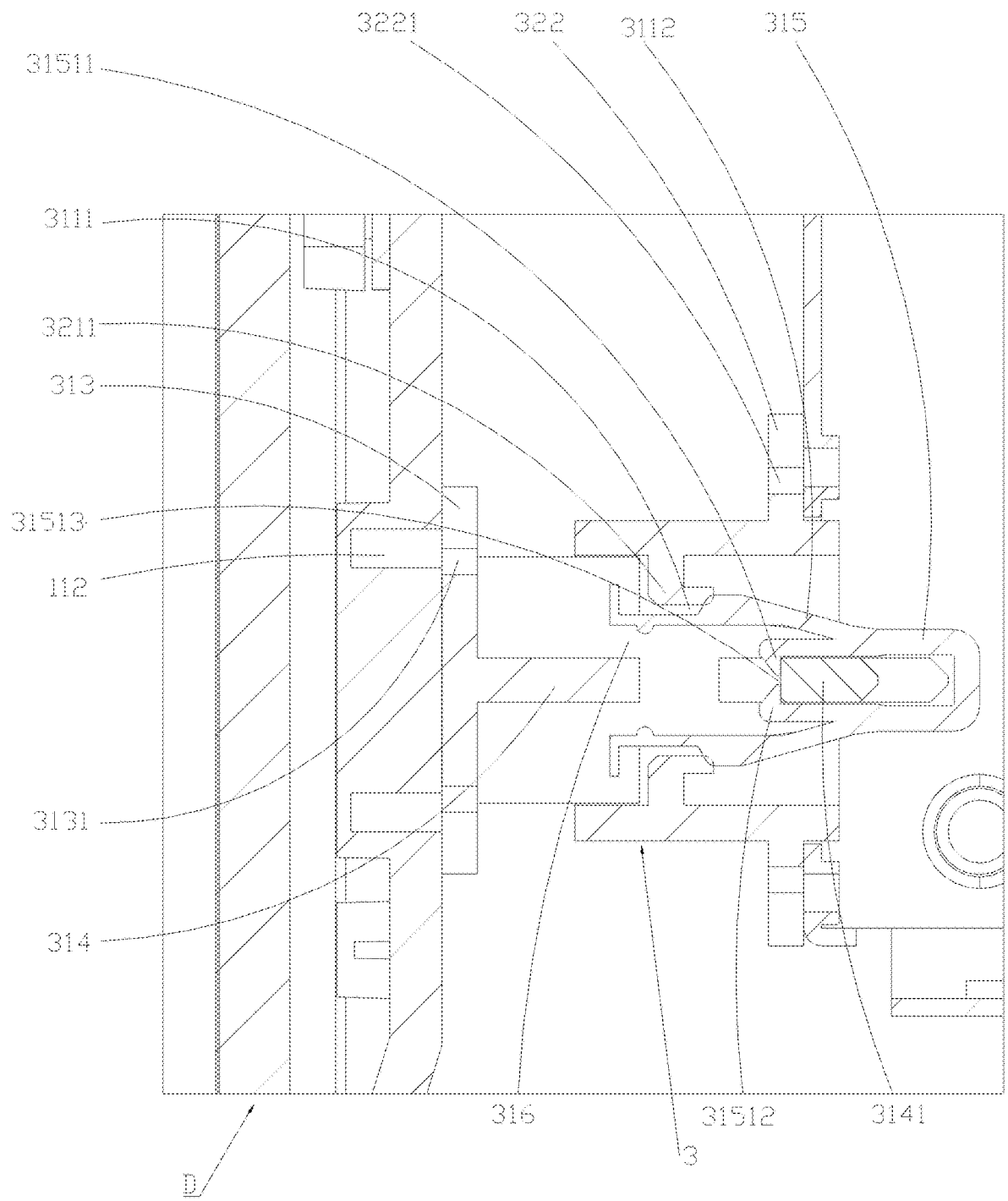
FIG. 9 is an enlarged view of area D in FIG. 8.
Figure 10:
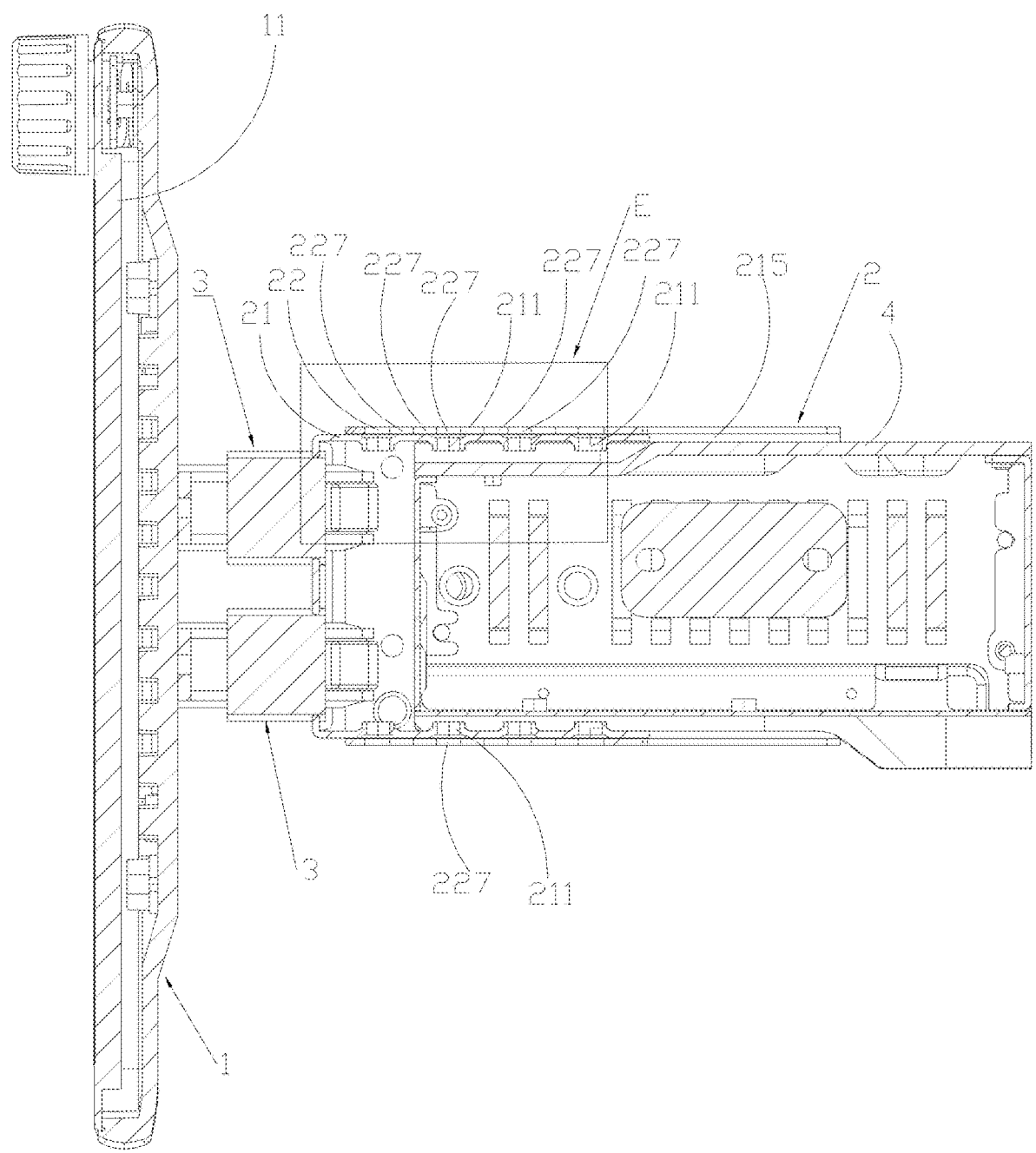
FIG. 10 is a sectional view cut along a screen, a main bracket, and a side bracket.
Figure 11:
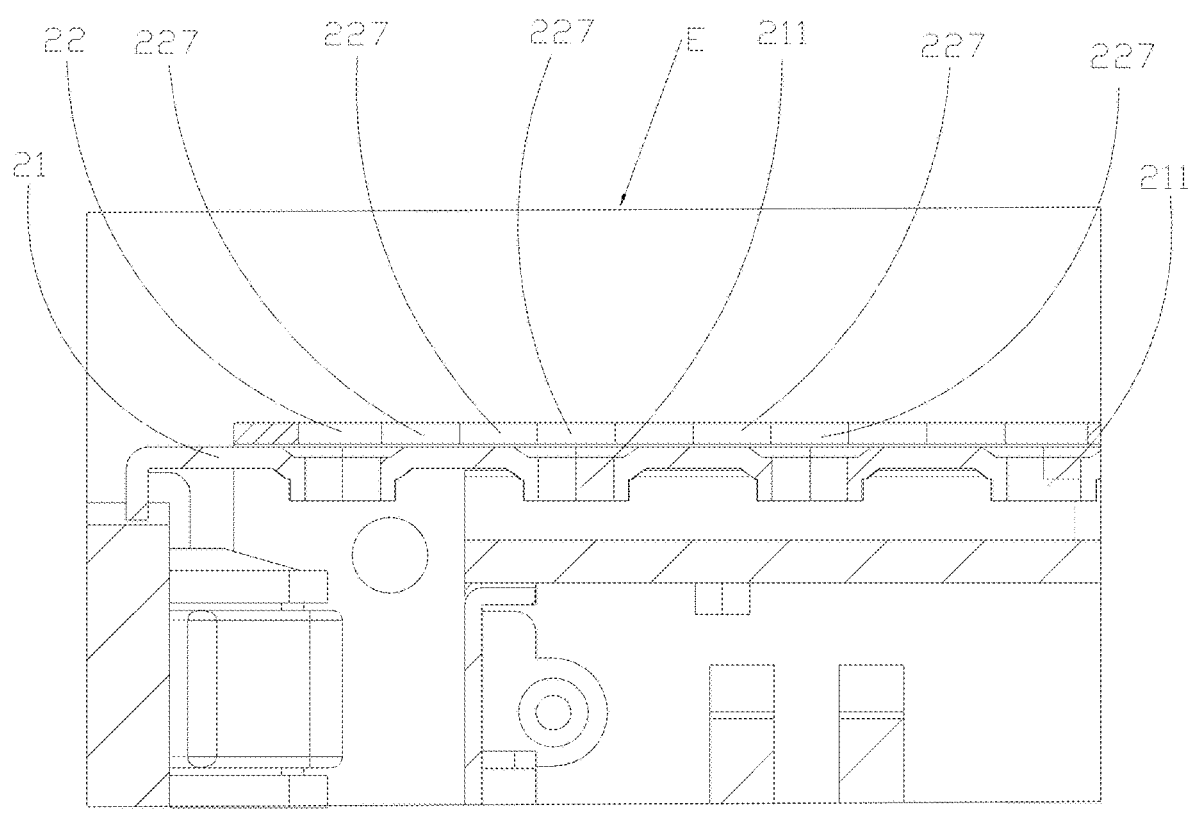
FIG. 11 is an enlarged view of area E in FIG. 10.
Figure 12:
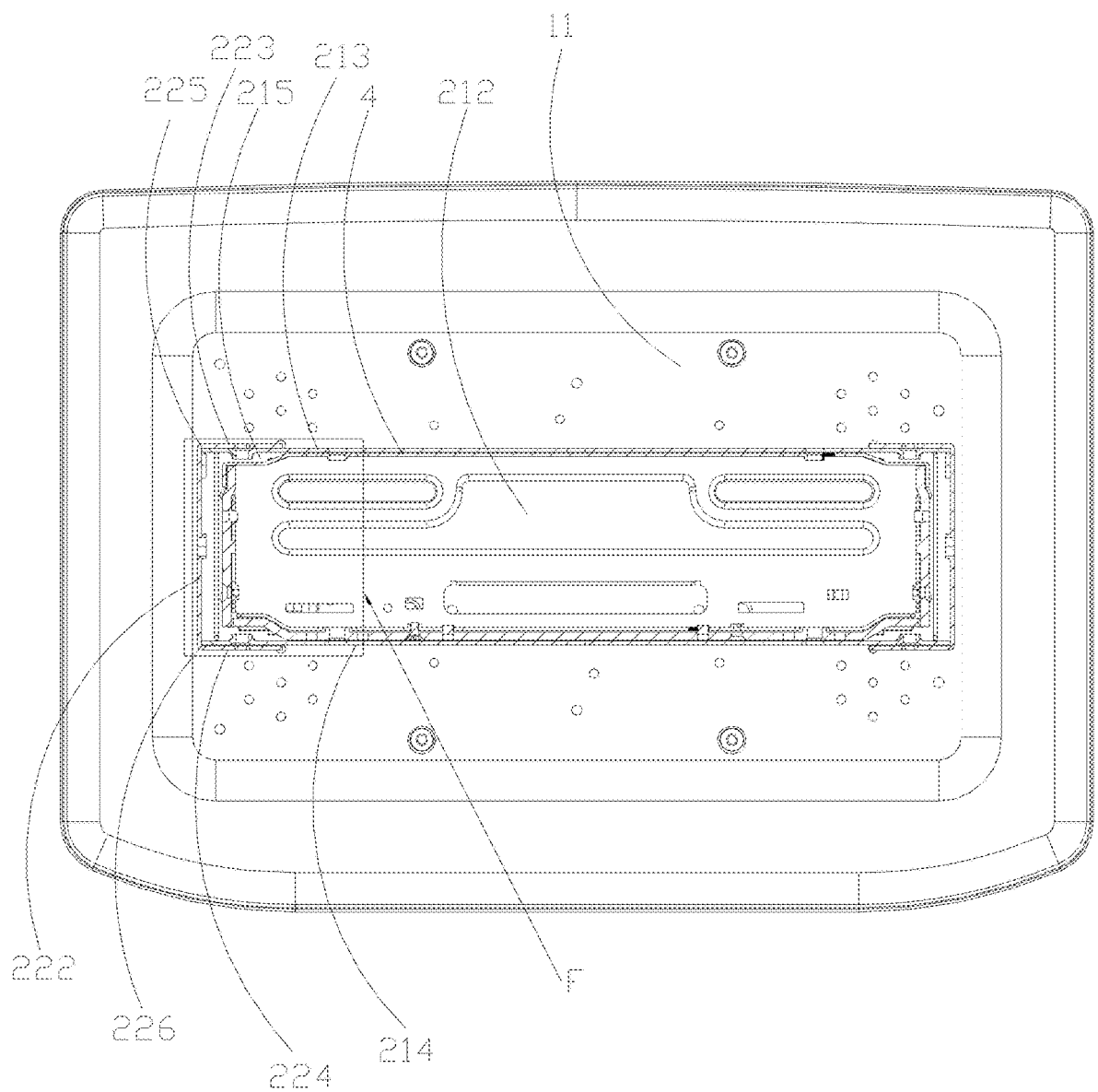
FIG. 12 is a sectional view cut along a host, a main bracket, and a side bracket.
Figure 13:
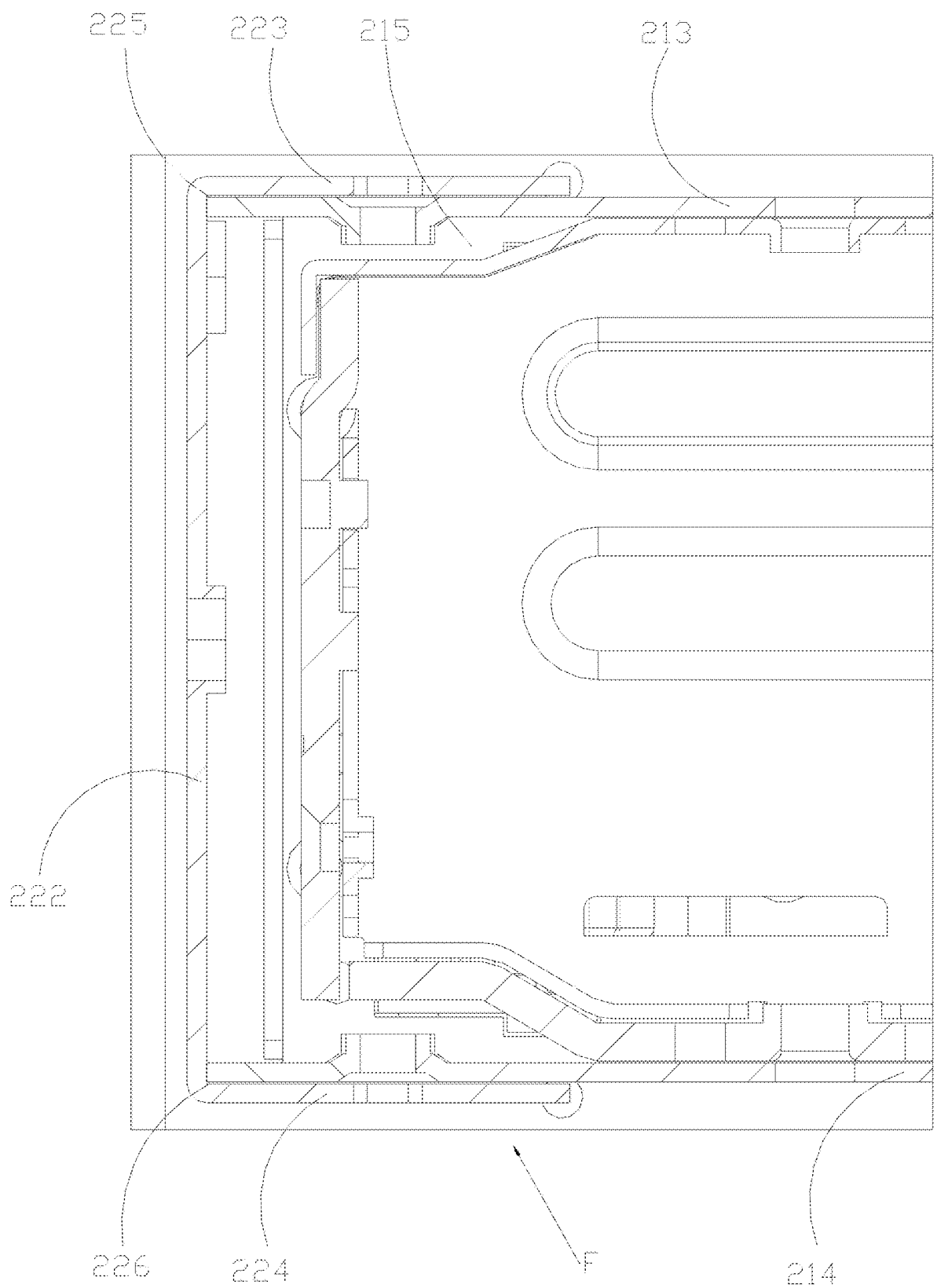
FIG. 13 is an enlarged view of area F in FIG. 12.
Figure 14:
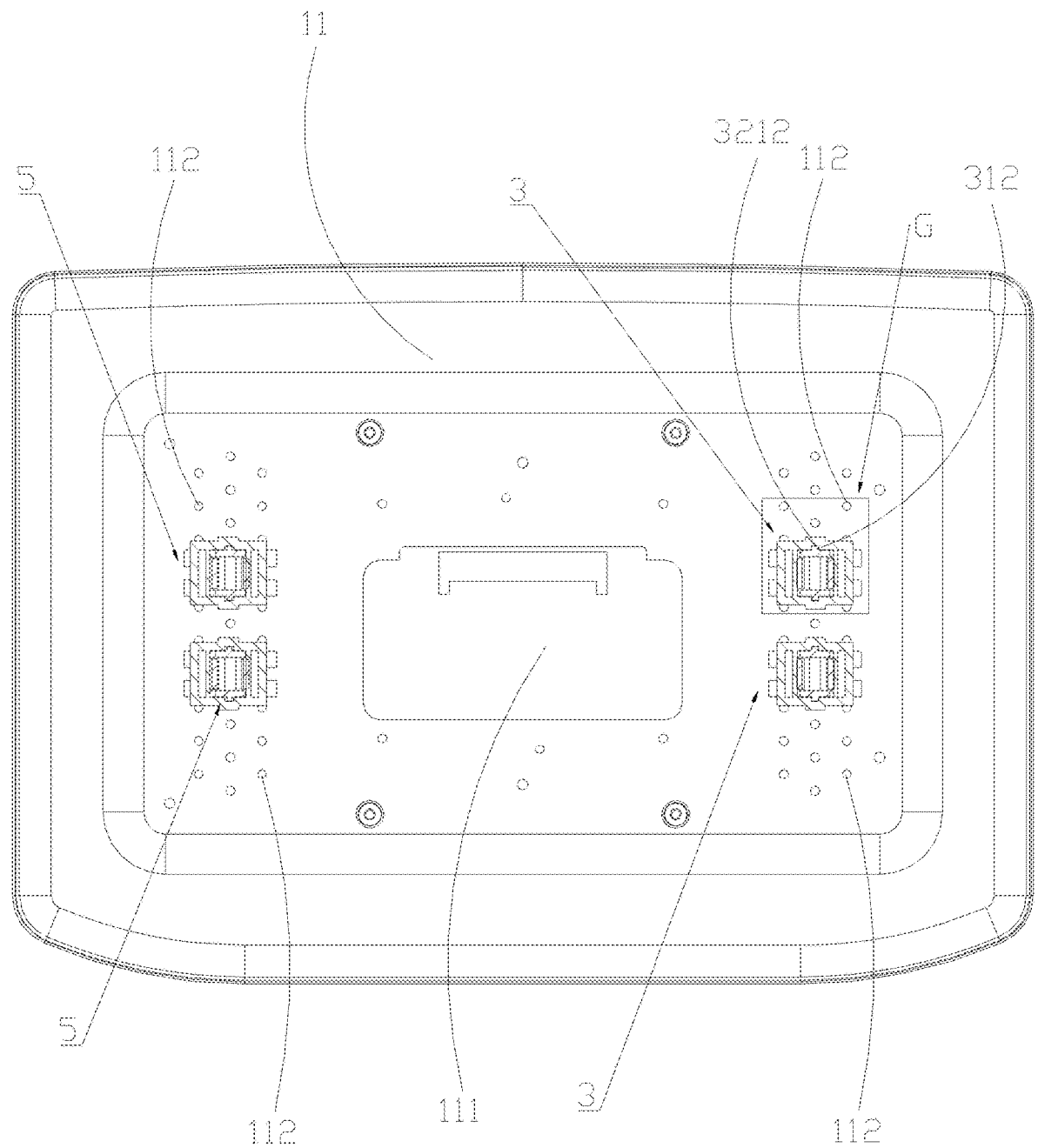
FIG. 14 is a sectional view cut along a first connecting part and a second connecting part.
Figure 15:
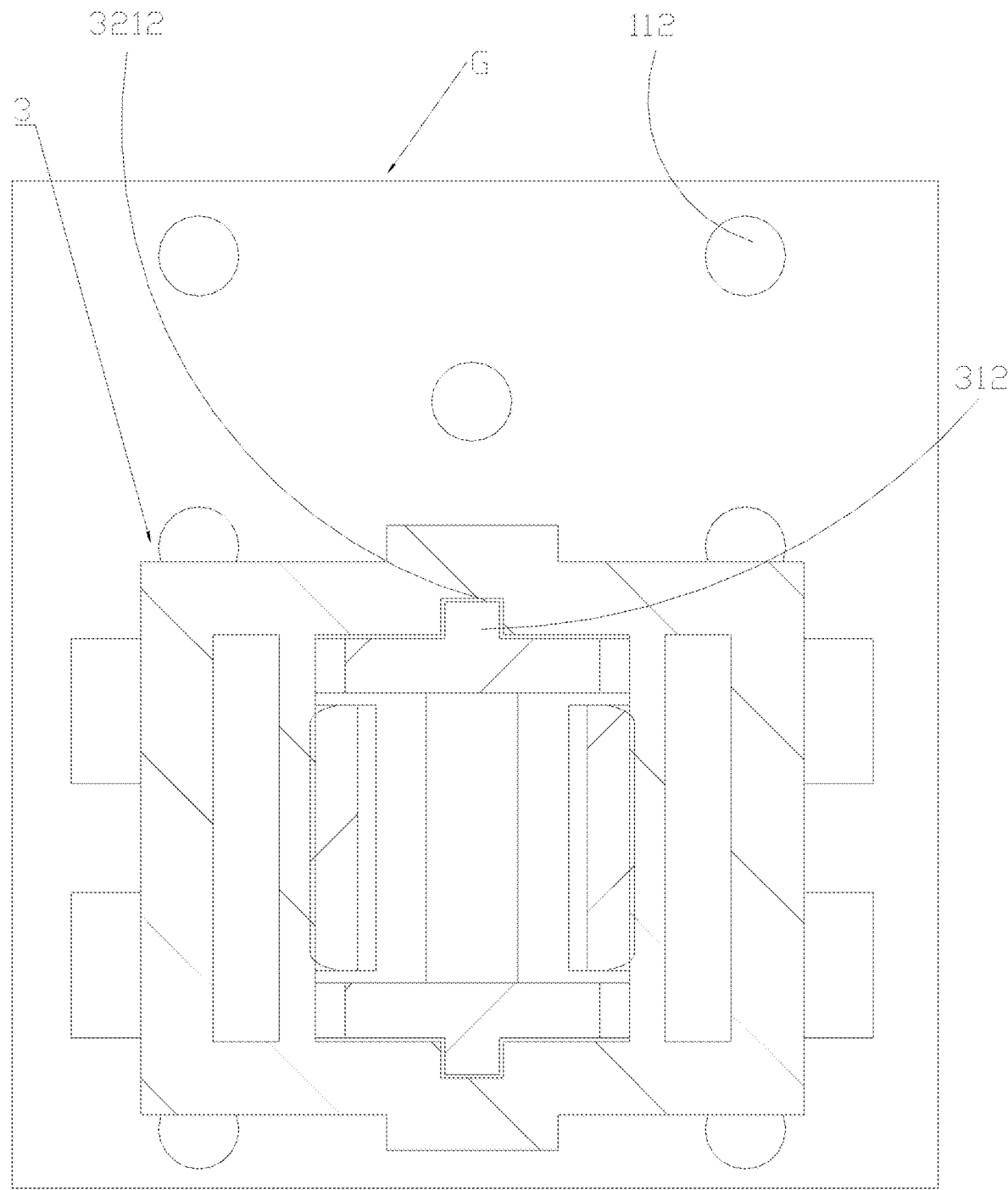
FIG. 15 is an enlarged view of area G in FIG. 14.

Referring to FIGS. 1-15, a navigation device includes a navigation device main body 1 and a mounting bracket 2. The mounting bracket 2 is detachably connected to the navigation device main body 1. The mounting bracket 2 is used for connecting with a car.

Through the above structure, the navigation device includes the navigation device main body 1 and the mounting bracket 2. The mounting bracket 2 is detachably connected to the navigation device main body 1. The mounting bracket 2 is used for connecting with the car. Therefore, the navigation device main body 1 is capable of being disassembled and separated from the mounting bracket 2. This not only facilitates production, manufacturing, and marketing, but also makes it easy for a user to install the navigation device main body 1 and the mounting bracket 2. Moreover, the navigation device has strong universality, and the navigation device main body 1 or the mounting bracket 2 can be replaced according to the needs of different users. The difficulty of modification is relatively small, especially for people who need to modify their car navigation devices. Non professionals can also complete the modification work easily, thereby greatly improving the user's modification experience, and effectively reducing the return rate.

In this embodiment, the navigation device main body 1 includes a screen 11. The screen 11 is detachably connected to the mounting bracket 2. The navigation device further includes first connecting parts 3. The screen 11 is detachably connected to the mounting bracket 2 through the first connecting part 3. The navigation device main body 1 further includes a host 4. The host 4 is electrically connected to the screen 11. Through the above structure, as the screen 11 is detachably connected to the mounting bracket 2 through the first connecting part 3, users can choose to replace the screen 11 with different sizes and models according to their preferences to meet the modification needs of different users.

In this embodiment, the navigation device main body 1 further includes a host 4. The host 4 is electrically connected to the screen 11. The host 4 is electrically connected to the screen 11 through an electrical connection cable 7. The host 4 is detachably connected to the mounting bracket 2. Through the above structure, the navigation device main body 1 further includes the host 4, the host 4 is electrically connected to the screen 11 through the electrical connection cable 7, and the host 4 is detachably connected to the mounting bracket 2, so that the user can selectively install the host 4 on the mounting bracket 2 or on other positions in the car, further reducing the difficulty of installing the navigation device.

In this embodiment, the navigation device further includes second connecting parts 5. The screen 11 is detachably connected to the mounting bracket 2 through the first connecting part 3 and the second connecting part 5. The first connecting part 3 and the second connecting part 5 are arranged in sequence from left to right along the screen 11 and the mounting bracket 2.

Through the above structure, the screen 11 is detachably connected to the mounting bracket 2 through the first connecting part 3 and the second connecting part 5, and the first connecting part 3 and the second connecting part 5 are arranged in sequence from left to right along the screen 11 and the mounting bracket 2, so that both a left side and a right side of the screen 11 are connected to the mounting bracket 2, greatly improving the stability of the installation of the screen 11 and making it less likely for the screen 11 to fall off. Furthermore, the user can selectively connect one of the first connecting part 3 and the second connecting part 5 to adjust up and down positions of the screen 11, making it easier for the user to install the screen 11.

In this embodiment, a total number of the first connecting parts 3 is at least two, and at least two of the first connecting parts 3 are arranged in sequence from top to bottom along the screen 11 and the mounting bracket 2. A total number of the second connecting parts 5 is at least two, and at least two of the second connecting parts 5 are arranged in sequence from top to bottom along the screen 11 and the mounting bracket 2. Through the above structure, at least two of the first connecting parts 3 are arranged in sequence from top to bottom along the screen 11 and the mounting bracket 2, and at least two of the second connecting parts 5 are arranged in sequence from top to bottom along the screen 11 and the mounting bracket 2, so that both an upper side and a lower side of the screen 11 are connected to the mounting bracket 2, greatly improving the stability of the installation of the screen 11 and making it less likely for the screen 11 to fall off. Furthermore, the user can selectively connect one of the two first connecting parts 3, and can selectively connect one of the two second connecting parts 5, so as to adjust the up and down positions of the screen 11, making it easier for the user to install the screen 11. In this embodiment, the first connecting part 3 includes a first connecting member 31 and a first connecting fitting member 32. The first connecting member 31 is connected to the screen 11, the first connecting fitting member 32 is connected to the mounting bracket 2, and the first connecting member 31 is detachably connected to the first connecting fitting member 32. The first connecting member 31 is a first connecting buckle, and the first connecting fitting member 32 is provided with a first connecting opening 321. The first connecting buckle is provided with an elastic wall 311. When the first connecting buckle is inserted into the first connecting opening 321, the elastic wall 311 is pressed against and locked to an inner wall of the first connecting opening 321. Alternatively, the first connecting fitting member 32 is a first connecting buckle, the first connecting member 31 is provided with a first connecting opening 321, and the first connecting buckle is provided with an elastic wall 311. When the first connecting buckle is inserted into the first connecting opening 321, the elastic wall 311 is pressed against and locked to an inner wall of the first connecting opening 321. Specifically, the elastic wall 311 is provided with concave fixing slot portions 3111 and guiding inclined surfaces 3112 adjacent to the fixing slot portions 3111. The guiding inclined surface 3112 is connected to the fixing slot portion 3111, and the inner wall of the first connecting opening 321 is equipped with protruding buckle portions 3211. The guiding inclined surface 3112 and the fixing slot portion 3111 pass through the first connecting opening 321 in sequence, so that the fixing slot portion 3111 is engaged with the buckle portion 3211. Through the above structure, the setting of the first connecting part 3 is effectively achieved, and when the user needs to connect the first connecting buckle to the first connecting opening 321, the first connecting buckle can be inserted into the first connecting opening 321. During the process of inserting the first connecting buckle into the first connecting opening 321, the guiding inclined surface 3112 and the fixing slot portion 3111 of the elastic wall 311 pass through the first connecting opening 321 in sequence, and the elastic wall 311 is squeezed. When the fixing slot portion 3111 is connected to the buckle portion 3211, an elastic restoring force generated when the elastic wall 311 is squeezed pushes the elastic wall 311 to be restored, so that the buckle portion 3211 of the elastic wall 311 is pressed against the fixing slot portion 3111, thereby completing the connection between the first connecting member 31 and the first connecting fitting member 32, and completing the connection between the screen 11 and the mounting bracket 2. Moreover, when the user needs to detach the screen 11 from the mounting bracket 2, only an external force greater than the elastic restoring force of the elastic wall 311 needs to be applied to the screen 11, and the elastic wall 311 will be squeezed, so that the buckle portion 3211 can detach from the fixing slot portion 3111 along the guiding inclined surface 3112, and the first connecting member 31 and the first connecting fitting member 32 can be separated to detach the screen 11 from the mounting bracket 2, making it easy for the user to disassemble and assemble the screen 11. In particular, when the mounting bracket 2 is connected to the car, due to a limited space inside the car, the disassembly and assembly of the screen 11 and the mounting bracket 2 are extremely difficult. The disassembly and assembly structure of the first connecting member 31 and the first connecting fitting member 32 effectively solves this difficulty. Furthermore, the elastic wall 311 includes two fixing slot portions 3111. The elastic wall 311 includes two guiding inclined surfaces 3112. The two fixing slot portions 3111 are respectively positioned on a left side and a right side of the elastic wall 311, and the two guiding inclined surfaces 3112 are respectively positioned on the left side and the right side of the elastic wall 311. Furthermore, the first connecting member 31 is detachably connected to the screen 11 through screws, and the first connecting fitting member 32 is detachably connected to the mounting bracket 2 through screws.

In this embodiment, the mounting bracket 2 includes a main bracket 21 and side brackets 22. The main bracket 21 is detachably connected to the side bracket 22, and the main bracket 21 is connected to the screen 11. The side bracket 22 is used for connecting with the car. The side bracket 22 is provided with a first mounting hole 221. The first mounting hole 221 is used for connecting with the car. Through the above structure, compared with an existing integral-machine navigation device, the integral-machine navigation device needs to be connected to a navigation device mounting hole of the car. The integral-machine navigation device needs to have a hole corresponding to the navigation device mounting hole of the car. The navigation device mounting holes of different car models are different and have tens of thousands of variations. The existing practice on the market is to drill a hole on the integral-machine navigation device, so that the integral-machine navigation device has the hole corresponding to the navigation device mounting hole of the car. However, some non professional modification users not only find it difficult to set the hole of the integral-machine navigation device to be consistent with the navigation device mounting hole of the car, but also often drill through the host 4 of the integral-machine navigation device during the drilling process, resulting in the entire navigation device being directly scrapped. Since the mounting bracket 2 in the present application includes the main bracket 21 and the side bracket 22, the main bracket 21 is detachably connected to the side bracket 22, the main bracket 21 is connected to the screen 11, the side bracket 22 is used for connecting with the car, the side bracket 22 is provided with the first mounting hole 221, and the first mounting hole 221 is used for connecting with the car, the user can directly purchase and replace the side bracket 22 with one that matches the model of the car. The modular design allows the user to select the side bracket 22 equipped with the first mounting hole 221 which is consistent with the navigation device mounting hole of the car according to different car models, so that the user can directly connect the side bracket 22 that matches the model and mounting hole of the car to the main bracket 21, and then connect the first mounting hole 221 of the side bracket 22 to the navigation device mounting hole of the car to complete the installation of the navigation device. The installation is simple, thereby greatly improving the user experience, reducing the return rate of the navigation device, and solving the difficulty of installing the navigation device. Taking a step back, even if the user has not selected the side bracket 22 that matches the navigation device mounting hole of the car, the user can first drill the first mounting hole 221 that matches the navigation device mounting hole of the car on the existing side bracket 22, then connect the side bracket 22 to the main bracket 21, and finally connect the first mounting hole 221 of the side bracket 22 to the navigation device mounting hole of the car to complete the installation of the navigation device. This can prevent the host 4 of the integral-machine navigation device from being pierced during the drilling process and prevent the navigation device from being damaged. A total number of the side brackets 22 is two, and the two side brackets 22 are respectively detachably connected to a left side and a right side of the main bracket 21.

In this embodiment, the side bracket 22 is slidably connected to the main bracket 21, so that the side bracket 22 is capable of sliding and telescoping on the main bracket 21. Through the above structure, the side bracket 22 is slidably connected to the main bracket 21, allowing the side bracket 22 to slide and telescope on the main bracket 21, and the screen 11 is connected to the main bracket 21, so that when the side bracket 22 is fixed to the car, front and rear positions of the screen 11 can be adjusted by relative sliding and telescoping between the main bracket 21 and the side bracket 22. For example, when a size of the screen 11 is larger than a navigation device embedding hole of the car, the screen 11 can be extended to suspend above the navigation device embedding hole of the car, so that the size of the screen 11 is not limited by the car's navigation device embedding hole, allowing the user to choose more models of the screen 11 to meet needs. Moreover, the screen 11 suspended above the navigation device embedding hole of the car is not only more beautiful and personalized, but also easy to install and disassemble, with stronger universality, which is a blessing for car modification users.

In this embodiment, the navigation device further includes a first locking member 6. The first locking member 6 is used for locking the side bracket 22 to the main bracket 21, so that the side bracket 22 and the main bracket 21 cannot slide against each other. When the first locking member 6 unlocks the main bracket 21 and the side bracket 22, the side bracket 22 can slide and telescope on the main bracket 21. The side bracket 22 is provided with a plurality of first adjusting holes 227, and the main bracket 21 is provided with second adjusting holes 211. When the side bracket 22 slides and telescopes on the main bracket 21 until the first adjusting hole 227 aligns with the second adjusting hole 211, the first locking member 6 passes through the first adjusting hole 227 and the second adjusting hole 211 to lock the side bracket 22 to the main bracket 21, so that the side bracket 22 and the main bracket 21 cannot slide against each other. Alternatively, the main bracket 21 is provided with a plurality of first adjusting holes 227, and the side bracket 22 is provided with second adjusting holes 211. When the side bracket 22 slides and telescopes on the main bracket 21 until the first adjusting hole 227 aligns with the second adjusting hole 211, the first locking member 6 passes through the first adjusting hole 227 and the second adjusting hole 211 to lock the side bracket 22 to the main bracket 21, so that the side bracket 22 and the main bracket 21 cannot slide against each other. Specifically, the navigation device main body 1 further includes a host 4, and the host 4 is electrically connected to the screen 11. The host 4 is detachably connected to the mounting bracket 2. The main bracket 21 includes a first middle side wall 212, a first upper side wall 213, and a first lower side wall 214. The first upper side wall 213 extends from an upper side of the first middle side wall 212, and the first lower side wall 214 extends from a lower side of the first middle side wall 212. The first middle side wall 212 is provided with a first front surface 2121 and a first rear surface 2122. The first front surface 2121 of the first middle side wall 212 is detachably connected to the screen 11. A first accommodating cavity 215 is formed between the first upper side wall 213, the first lower side wall 214, and the first rear surface 2122 of the first middle side wall 212. The host 4 is detachably arranged in the first accommodating cavity 215. The host 4 is detachably connected to the main bracket 21. Furthermore, the side bracket 22 is detachably connected to the first upper side wall 213 and the first lower side wall 214. The side bracket 22 includes a second middle side wall 222, a second upper side wall 223, and a second lower side wall 224. The second upper side wall 223 extends from an upper side of the second middle side wall 222, and the second lower side wall 224 extends from a lower side of the second middle side wall 222. The second upper side wall 223 is detachably connected to the first upper side wall 213 through the first locking member 6, and the second lower side wall 224 is detachably connected to the first lower side wall 214 through the first locking member 6. A first sliding slot 225 is formed between the second upper side wall 223 and the second middle side wall 222, and a second sliding slot 226 is formed between the second lower side wall 224 and the second middle side wall 222. When the locking of the first locking member 6 is released, the first upper side wall 213 is slidable inside the first sliding slot 225, and the first lower side wall 214 is slidable inside the second sliding slot 226. The plurality of first adjusting holes 227 are in communication with each other. Through the above structure, the detachable connection between the host 4 and the main bracket 21 is effectively achieved, allowing the user to install the host 4 in the first accommodating cavity 215 or in other positions, thereby reducing the difficulty of installing the navigation device. Furthermore, when the user needs to adjust the front and rear positions of the screen 11, the locking of the first locking member 6 can be released, and the front and rear positions of the screen 11 can be adjusted by sliding and telescoping relative to each other between the main bracket 21 and the side bracket 22. After adjustment, the side bracket 22 can be locked to the main bracket 21 by the first locking member 6, so that the side bracket 22 and the main bracket 21 cannot slide or telescope relative to each other, thereby fixing the position of the screen 11. Furthermore, the plurality of first adjusting holes 227 provide a plurality of locking positions for adjusting and fixing the position of the screen 11. Furthermore, the first locking member 6 is a locking screw.

In this embodiment, the first upper side wall 213 is provided with a first avoidance notch 2131, and the first lower side wall 214 is provided with a second avoidance notch 2141. The first upper side wall 213 and the first middle side wall 212 are arranged at a right angle, obtuse angle, or acute angle. The first lower side wall 214 and the first middle side wall 212 are arranged at a right angle, obtuse angle, or acute angle. The second upper side wall 223 and the second middle side wall 222 are arranged at a right angle, obtuse angle, or acute angle. The second lower side wall 224 and the second middle side wall 222 are arranged at a right angle, obtuse angle, or acute angle. The screen 11 is provided with a first data interface 111, and the host 4 is provided with a second data interface 41. The first data interface 111 is electrically connected to the second data interface 41 through the electrical connection cable 7. The main bracket 21 is equipped with a third avoidance notch 216, and the first data interface 111 can be exposed from the main bracket 21 through the third avoidance notch 216, so that the electrical connection cable 7 can be electrically connected to the first data interface 111 through the third avoidance notch 216. Through the above structure, the electrical connection between the screen 11, the electrical connection cable 7, and the host 4 is effectively achieved, allowing the user to install the host 4 in the first accommodating cavity 215 or in other positions of the car. Moreover, the host 4 is internally equipped with a cooling fan. A plurality of cooling openings 4111 are defined in the host 4. The design of the first avoidance notch 2131 and the second avoidance notch 2141 facilitates the installation of the host 4. At the same time, the first avoidance notch 2131 and the second avoidance notch 2141 can avoid the cooling openings 4111 of the host 4, making it easier for the cooling fan of the host 4 to dissipate heat through the cooling openings 4111.

In this embodiment, the first connecting member 31 is detachably connected to the screen 11, and the first connecting fitting member 32 is detachably connected to the mounting bracket 2. A plurality of fifth adjusting holes 112 are defined in the screen 11. The plurality of fifth adjusting holes 112 are arranged in sequence from top to bottom along the screen 11. The first connecting member 31 is detachably connected to one of the plurality of fifth adjusting holes 112. Alternatively, a plurality of fifth adjusting holes 112 are defined in the screen 11, the plurality of fifth adjusting holes 112 are arranged in sequence from left to right along the screen 11, and the first connecting member 31 is detachably connected to one of the plurality of fifth adjusting holes 112. Through the above structure, the plurality of fifth adjusting holes 112 are arranged in sequence from top to bottom along the screen 11, and the first connecting member 31 is detachably connected to one of the plurality of fifth adjusting holes 112, so that the up and down positions of the screen 11 can be adjusted, facilitating the user to accurately install the screen 11 of the navigation device main body 1 and adjust the screen 11 to the most suitable position. The plurality of fifth adjusting holes 112 are defined in the screen 11, the plurality of fifth adjusting holes 112 are arranged in sequence from left to right along the screen 11, and the first connecting member 31 is detachably connected to one of the plurality of fifth adjusting holes 112, so that the left and right positions of the screen 11 can be adjusted, making it easy for the user to accurately install the screen 11 of the navigation device main body 1 and adjust the screen 11 to the most suitable position.

In this embodiment, the first connecting member 31 is a first connecting buckle, and the first connecting fitting member 32 is equipped with a first connecting opening 321. The first connecting buckle is equipped with an elastic wall 311. When the first connecting buckle is inserted into the first connecting opening 321, the elastic wall 311 is pressed against and locked to an inner wall of the first connecting opening 321. Alternatively, the first connecting fitting member 32 is a first connecting buckle, the first connecting member 31 is equipped with a first connecting opening 321, and the first connecting buckle is equipped with an elastic wall 311. When the first connecting buckle is inserted into the first connecting opening 321, the elastic wall 311 is pressed against and locked to an inner wall of the first connecting opening 321. The first connecting member 31 is also equipped with first guiding protrusions 312, and the inner wall of the first connecting opening 321 is also provided with first guiding grooves 3212. The first guiding protrusion 312 is connected to the first guiding groove 3212. The first connecting member 31 is also provided with a first connecting lug 313. The first connecting lug 313 is provided with a second mounting hole 3131. The second mounting hole 3131 is used for detachable connection between the first connecting member 31 and one of the plurality of fifth adjusting holes 112. The first connecting fitting member 32 is also provided with a second connecting lug 322. The second connecting lug 322 is provided with a third mounting hole 3221. The third mounting hole 3221 is used for detachable connection between the first connecting fitting member 32 and the mounting bracket 2. The first connecting member 31 includes a main body part 314 and an elastic part 315. The elastic part 315 is detachably connected to the main body part 314, and the elastic wall 311 is provided on the elastic part 315. An elastic gap 316 is defined between the elastic wall 311 and the main body part 314. The main body part 314 is provided with a mounting block 3141, and the elastic part 315 is provided with a mounting slot 3151. An upper side of the mounting slot 3151 is provided with a first elastic block 31511, and a lower side of the mounting slot 3151 is provided with a second elastic block 31512. A flexible slit 31513 is formed between the first elastic block 31511 and the second elastic block 31512, and the mounting block 3141 is inserted into the mounting slot 3151 through the slit 31513. The first elastic block 31511 and the second elastic block 31512 stop the mounting block 3141 in the mounting slot 3151. Furthermore, the first connecting opening 321 is equipped with two buckle portions 3211. The two buckle portions 3211 are respectively positioned on a left side and a right side of an inner wall of the first connecting opening 321. The first connecting opening 321 is provided with two first guiding grooves 3212. The two first guiding grooves 3212 are respectively positioned in an upper side and a lower side of the inner wall of the first connecting opening 321. Through the above structure, the setting between the main body part 314 and the elastic part 315 is effectively achieved. When the mounting block 3141 is inserted into the mounting slot 3151 through the slit 31513, the mounting block 3141 will press the first elastic block 31511 and the second elastic block 31512, and the slit 31513 will be stretched open by the mounting block 3141 to undergo elastic deformation, so that the mounting block 3141 can be smoothly inserted into the mounting slot 3151. After the mounting block 3141 is inserted into the mounting slot 3151, the first elastic block 31511 and the second elastic block 31512 are restored to shrink the slit 31513, thereby stopping the mounting block 3141 in the mounting slot 3151, and completing the connection between the main body part 314 and the elastic part 315.

In this embodiment, the second upper side wall and the second lower side wall are both provided with the first adjusting holes, and the first upper side wall and the first lower side wall are both provided with the second adjusting holes. The first mounting hole is defined in the second middle side wall. The first mounting hole includes a first mounting hole unit 22111, a second mounting hole unit 22112, and a third mounting hole unit 22113. The shapes of the first mounting hole unit, the second mounting hole unit, and the third mounting hole unit are different from each other. Through the above structure, due to the different shapes of the first mounting hole unit, the second mounting hole unit, and the third mounting hole unit, the difficulty of installing the side bracket onto the car can be further reduced, making it easier for the user to connect the side bracket with the navigation device mounting hole of the car. The second connecting part in the present application has an identical structure with the first connecting part.

The above presents one or more embodiments provided in conjunction with specific content and does not limit the specific implementations of the utility model to these descriptions. Any methods, structures, or similar equivalents related to the utility model, or any technical deductions or substitutions made under the premise of the conceptual framework of this utility model, shall be considered within the scope of protection of this utility model.

What is claimed is:

1. A navigation device, comprising:
a navigation device main body; and
a mounting bracket, wherein the mounting bracket is detachably connected to the navigation device main body, and the mounting bracket is used for connecting with a car;
wherein the navigation device main body comprises a screen, and the screen is detachably connected to the mounting bracket; the navigation device further comprises first connecting parts, and the screen is detachably connected to the mounting bracket through the first connecting part;
wherein the mounting bracket comprises a main bracket and side brackets, the main bracket is detachably connected to the side bracket, the main bracket is connected to the screen, and the side bracket is used for connecting with the car.

2. The navigation device according to claim 1, wherein the navigation device main body further comprises a host, the host is electrically connected to the screen, and the host is electrically connected to the screen through an electrical connection cable.

3. The navigation device according to claim 1, wherein the navigation device main body further comprises a host, the host is electrically connected to the screen, and the host is detachably connected to the mounting bracket.

4. The navigation device according to claim 1, further comprising second connecting parts, wherein the screen is detachably connected to the mounting bracket through the first connecting part and the second connecting part, and the first connecting part and the second connecting part are arranged in sequence from left to right along the screen and the mounting bracket.

5. The navigation device according to claim 4, wherein a total number of the first connecting parts is at least two, and at least two of the first connecting parts are arranged in sequence from top to bottom along the screen and the mounting bracket; a total number of the second connecting parts is at least two, and at least two of the second connecting parts are arranged in sequence from top to bottom along the screen and the mounting bracket.

6. The navigation device according to claim 1, wherein the first connecting part comprises a first connecting member and a first connecting fitting member, the first connecting member is connected to the screen, the first connecting fitting member is connected to the mounting bracket, and the first connecting member is detachably connected to the first connecting fitting member.

7. The navigation device according to claim 6, wherein the first connecting member is a first connecting buckle, the first connecting fitting member is provided with a first connecting opening, the first connecting buckle is provided with an elastic wall, and when the first connecting buckle is inserted into the first connecting opening, the elastic wall is pressed against and locked to an inner wall of the first connecting opening.

8. The navigation device according to claim 7, wherein the elastic wall is provided with concave fixing slot portions and guiding inclined surfaces adjacent to the fixing slot portions, the guiding inclined surface is connected to the fixing slot portion, the inner wall of the first connecting opening is equipped with protruding buckle portions, and the guiding inclined surface and the fixing slot portion pass through the first connecting opening in sequence, so that the fixing slot portion is engaged with the buckle portion.

9. The navigation device according to claim 1, wherein the side bracket is provided with a first mounting hole, and the first mounting hole is used for connecting with the car.

10. The navigation device according to claim 1, wherein the side bracket is slidably connected to the main bracket, so that the side bracket is capable of sliding and telescoping on the main bracket.

11. The navigation device according to claim 10, further comprising a first locking member, wherein the first locking member is used for locking the side bracket to the main bracket, so that the side bracket and the main bracket cannot slide against each other; when the first locking member unlocks the main bracket and the side bracket, the side bracket can slide and telescope on the main bracket.

12. The navigation device according to claim 11, wherein the side bracket is provided with a plurality of first adjusting holes, the main bracket is provided with second adjusting holes, and when the side bracket slides and telescopes on the main bracket until the first adjusting hole aligns with the second adjusting hole, the first locking member passes through the first adjusting hole and the second adjusting hole to lock the side bracket to the main bracket, so that the side bracket and the main bracket cannot slide against each other; alternatively, the main bracket is provided with a plurality of first adjusting holes, the side bracket is provided with second adjusting holes, and when the side bracket slides and telescopes on the main bracket until the first adjusting hole aligns with the second adjusting hole, the first locking member passes through the first adjusting hole and the second adjusting hole to lock the side bracket to the main bracket, so that the side bracket and the main bracket cannot slide against each other.

13. The navigation device according to claim 11, wherein the navigation device main body further comprises a host, and the host is electrically connected to the screen; the host is detachably connected to the mounting bracket; the main bracket comprises a first middle side wall, a first upper side wall, and a first lower side wall; the first upper side wall extends from an upper side of the first middle side wall, and the first lower side wall extends from a lower side of the first middle side wall; the first middle side wall is provided with a first front surface and a first rear surface, and the first front surface of the first middle side wall is detachably connected to the screen; a first accommodating cavity is formed between the first upper side wall, the first lower side wall, and the first rear surface of the first middle side wall; the host is detachably arranged in the first accommodating cavity; and the host is detachably connected to the main bracket.

14. The navigation device according to claim 13, wherein the side bracket is detachably connected to the first upper side wall and the first lower side wall; the side bracket comprises a second middle side wall, a second upper side wall, and a second lower side wall; the second upper side wall extends from an upper side of the second middle side wall, and the second lower side wall extends from a lower side of the second middle side wall; the second upper side wall is detachably connected to the first upper side wall through the first locking member, and the second lower side wall is detachably connected to the first lower side wall through the first locking member; a first sliding slot is formed between the second upper side wall and the second middle side wall, and a second sliding slot is formed between the second lower side wall and the second middle side wall; when the locking of the first locking member is released, the first upper side wall can slide inside the first sliding slot, and the first lower side wall can slide inside the second sliding slot.

15. The navigation device according to claim 14, wherein the first upper side wall is provided with a first avoidance notch, and the first lower side wall is provided with a second avoidance notch; the first upper side wall and the first middle side wall are arranged at a right angle, obtuse angle, or acute angle; the first lower side wall and the first middle side wall are arranged at a right angle, obtuse angle, or acute angle; the second upper side wall and the second middle side wall are arranged at a right angle, obtuse angle, or acute angle; the second lower side wall and the second middle side wall are arranged at a right angle, obtuse angle, or acute angle; the screen is provided with a first data interface, the host is provided with a second data interface, and the first data interface is electrically connected to the second data interface through the electrical connection cable; the main bracket is equipped with a third avoidance notch, and the first data interface can be exposed from the main bracket through the third avoidance notch, so that the electrical connection cable can be electrically connected to the first data interface through the third avoidance notch.

16. The navigation device according to claim 6, wherein the first connecting member is detachably connected to the screen, and the first connecting fitting member is detachably connected to the mounting bracket.

17. The navigation device according to claim 16, wherein a plurality of fifth adjusting holes are defined in the screen, the plurality of fifth adjusting holes are arranged in sequence from top to bottom along the screen, and the first connecting member is detachably connected to one of the plurality of fifth adjusting holes.

18. The navigation device according to claim 17, wherein the first connecting member is a first connecting buckle, the first connecting fitting member is equipped with a first connecting opening, the first connecting buckle is equipped with an elastic wall, and when the first connecting buckle is inserted into the first connecting opening, the elastic wall is pressed against and locked to an inner wall of the first connecting opening; the first connecting member is also equipped with first guiding protrusions, the inner wall of the first connecting opening is also provided with first guiding grooves, and the first guiding protrusion is connected to the first guiding groove; the first connecting member is also provided with a first connecting lug, the first connecting lug is provided with a second mounting hole, and the second mounting hole is used for detachable connection between the first connecting member and one of the plurality of fifth adjusting holes; the first connecting fitting member is also provided with a second connecting lug, the second connecting lug is provided with a third mounting hole, and the third mounting hole is used for detachable connection between the first connecting fitting member and the mounting bracket; the first connecting member comprises a main body part and an elastic part, the elastic part is detachably connected to the main body part, the elastic wall is provided on the elastic part, and an elastic gap is defined between the elastic wall and the main body part; the main body part is provided with a mounting block, the elastic part is provided with a mounting slot, an upper side of the mounting slot is provided with a first elastic block, a lower side of the mounting slot is provided with a second elastic block, a flexible slit is formed between the first elastic block and the second elastic block, the mounting block is inserted into the mounting slot through the slit, and the first elastic block and the second elastic block stop the mounting block in the mounting slot.

* * * * *